US012811781B2

(12) United States Patent
Trauger

(10) Patent No.: US 12,811,781 B2
(45) Date of Patent: Nov. 24, 2026

(54) SYSTEMS AND METHODS FOR LAYERED SECURITY OF CELLULAR-ENABLED TELEMETERED DATA

(71) Applicant: Smart Meter LLC, Tampa, FL (US)

(72) Inventor: Derek Trauger, Lake Mary, FL (US)

(73) Assignee: Smart Meter LLC

( * ) Notice: Subject to any disclaimer, the term of this patent is extended or adjusted under 35 U.S.C. 154(b) by 54 days.

(21) Appl. No.: 18/985,749

(22) Filed: Dec. 18, 2024

(65) Prior Publication Data

US 2026/0172237 A1 Jun. 18, 2026

(51) Int. Cl.

| | |
|---|---|
| ***H04L 9/08*** | (2006.01) |
| ***H04L 9/06*** | (2006.01) |
| ***H04L 9/32*** | (2006.01) |
| ***H04W 12/033*** | (2021.01) |
| ***H04W 12/73*** | (2021.01) |

(52) U.S. Cl.

CPC ............ *H04L 9/085* (2013.01); *H04L 9/0618* (2013.01); *H04L 9/3247* (2013.01); *H04W 12/033* (2021.01); *H04W 12/73* (2021.01)

(58) Field of Classification Search

CPC ..... H04L 9/085; H04L 9/0618; H04L 9/3247; H04W 12/73; H04W 12/033

See application file for complete search history.

(56) References Cited

U.S. PATENT DOCUMENTS

2016/0337784 A1* 11/2016 Nicholson ........... H04L 63/0272
2019/0312928 A1* 10/2019 D'Ercoli ............. H04L 67/1095
2022/0165384 A1* 5/2022 Jibaja ...................... G16H 10/60
2022/0409053 A1* 12/2022 Taub ....................... G16H 50/50
2023/0146947 A1* 5/2023 Shelton, IV ....... A61B 17/1285 606/144
2024/0171546 A1* 5/2024 Hussain .............. H04L 63/0272
2025/0014731 A1* 1/2025 Soori-Arachi ....... G06Q 20/065

* cited by examiner

*Primary Examiner* — Linglan Edwards
*Assistant Examiner* — Jacob Benedict Knackstedt
(74) *Attorney, Agent, or Firm* — Bochner PLLC; Andrew D. Bochner

(57) ABSTRACT

A system for improving patient data transmission security comprising: a medical device; a wireless network connected to the medical device; a private network connected to the wireless network via an IPsec VPN tunnel; one or more computer processors; and a memory storing machine executable instructions, that when executed, cause the system to: receive, a patient interaction, the patient interaction including a medium from which raw patient data is collected; encrypt, v the raw patient data with a shared secret, creating encrypted patient data; generate, a first hash using a signing algorithm; transmit, the encrypted patient data from the medical device to the private network; generate, a second hash; compare, the first hash to the second hash; decrypt, the encrypted patient data upon a match of the first and second hash, creating verified patient data; and transmit, the verified patient data to a target recipient.

20 Claims, 4 Drawing Sheets

SYSTEMS AND METHODS FOR LAYERED SECURITY OF CELLULAR-ENABLED TELEMETERED DATA

FIELD OF THE PRESENT DISCLOSURE

The present disclosure is directed to systems and methods for layered security of cellular-enabled telemetered data. More specifically, the present disclosure is directed to systems and methods for layered security of cellular health data transmission.

INTRODUCTION

The healthcare industry has undergone a profound transformation driven by the digitization of patient records and medical information. Digitization of medical records has yielded numerous benefits to both patients and providers, including improved patient-provider dialogue, and patient medical literacy. Which, in turn, has fostered greater transparency between healthcare providers and their patients.

However, the digitization of patient health information has made said information susceptible to unauthorized acquisition via cyberattacks, due in-part to the value of said information. Consequently, data breaches via cyberattack can have devastating consequences, including identity theft, financial fraud, and compromised patient care. Accordingly, ensuring the security of sensitive medical information is of paramount importance.

As such, encryption technologies are employed to ensure the confidentiality, integrity, and security of patient health data. Typically, patient health data encryption involves utilization of advanced cryptographic techniques to encode sensitive medical data, rendering it inaccessible to unauthorized parties. This process transforms raw health information into ciphertext, which can only be decoded back into its original form using a decryption key only possessed by authorized individuals or systems.

Data encryption plays a vital role in ensuring compliance with regulatory requirements and industry standards, such as the Health Insurance Portability and Accountability Act (HIPAA) in the United States. HIPAA mandates stringent measures to protect the privacy and security of patient information, imposing severe penalties for non-compliance. Thus, data encryption is a fundamental component of data security measures outlined in these regulations, and failure to encrypt sensitive health data can result in legal repercussions and reputational damage for healthcare organizations.

Accordingly, it would be desirable to provide systems and methods for better safeguarding patient health data. Furthermore, it would also be desirable to provide systems and methods utilizing multiple layers of protection for remote data transmissions. Therefore, it would be beneficial to provide the systems and methods for layered security of cellular-enabled telemetered data described within the present disclosure.

SUMMARY

Bearing in mind the problems and deficiencies of the prior art, it is therefore an object of the present disclosure to provide a process and system for social interaction and community building.

Aspects of the present disclosure relate to a system for improving the security of cellular-enabled patient data transmission by layering security. The system comprising: a medical device; a wireless network connected to the medical device; a private network connected to the wireless network via a persistent and fully redundant Internet Protocol Security (IPsec) Virtual Private Network (VPN) tunnel; one or more computer processors; and a memory having stored therein machine executable instructions, that when executed by the one or more processors, cause the system to: receive, via the medical device, a patient interaction, the patient interaction including a medium from which raw patient data is collected; encrypt, via the medical device, the raw patient data with a shared secret, wherein encrypting the raw patient data creates encrypted patient data; generate, via the medical device, a first hash using a signing algorithm; transmit, via the persistent and fully redundant IPsec VPN tunnel, the encrypted patient data from the medical device to the private network; generate, via the private network, a second hash; compare, via the one or more computer processors, the first hash to the second hash; decrypt, via the one or more computer processors, the encrypted patient data upon a match of the first and second hash, wherein decrypting the encrypted patient data creates verified patient data; and transmit, via the one or more computer processors, the verified patient data to a target recipient.

In another embodiment, the shared secret is a symmetric-key algorithm comprising: a key; and a symmetric block cipher. Moreover, the key is comprised of at least one of a 128-bit key, a 256-bit key, a 576-bit key, and a 2040-bit key. Additionally, the symmetric block cipher is comprised of at least one of an Advanced Encryption Standard (AES) block cipher, a Blowfish block cipher, a CAST-256 block cipher, a GOST block cipher, an International Data Encryption Algorithm (IDEA) block cipher, a Rivest Cipher 6 (RC-6) block cipher, a Serpent block cipher, and a Twofish block cipher.

In a further embodiment, the persistent and fully redundant IPsec VPN tunnel leverages the symmetric-key algorithm to encrypt the encrypted patient data while said encrypted patient data is travelling through the persistent and fully redundant IPsec VPN tunnel.

Moreover, the medical device connects to the wireless network via an Access Point Name (APN).

In yet a further embodiment, the persistent and fully redundant IPsec VPN tunnel is further comprised of Transport Layer Security (TLS). Yet further, the verified patient data is transmitted to one or more client devices of the target recipient.

Lastly, the signing algorithm is comprised of at least one of Rivest-Shamir-Adleman (RSA) algorithms, EIGamal signature scheme, Digital Signing Algorithm (DSA), and Elliptical Curve Digital Signature Algorithm (ECDSA).

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

It is noted that description herein is not intended as an extensive overview, and as such, concepts may be simplified in the interests of clarity and brevity.

All documents mentioned in this application are hereby incorporated by reference in their entirety. Any process described in this application may be performed in any order and may omit any of the steps in the process. Processes may also be combined with other processes or steps of other processes.

Figure 1:
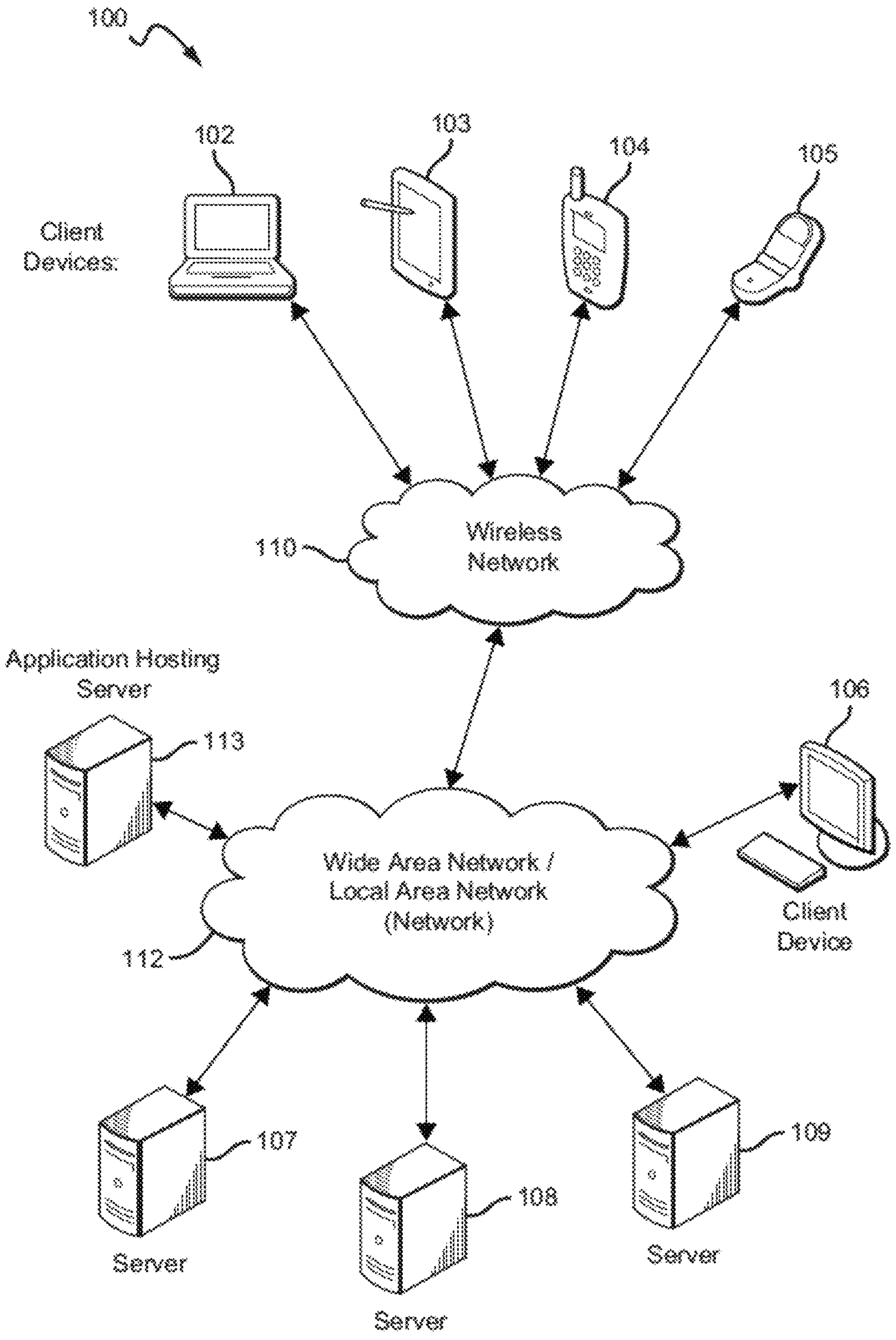
FIG. 1 illustrates an embodiment of an environment in which the present disclosure may be practiced.

FIG. 1 illustrates components of one embodiment of an environment in which the present disclosure may be practiced. Not all of the components may be required to practice the present disclosure, and variations in the arrangement and type of the components may be made without departing from the spirit or scope of the present disclosure. As shown, the system 100 includes one or more Local Area Networks ("LANs")/Wide Area Networks ("WANs") 112, one or more wireless networks 110, one or more wired or wireless client devices 106, mobile or other wireless client devices 102-105, servers 107-109, and may include or communicate with one or more data stores or databases. The client devices 102-106 may include, for example, at least one of desktop computers, laptop computers, set top boxes, tablets, cell phones, smart phones, smart speakers, wearable devices (such as the Apple Watch) and the like. Servers 107-109 can include, for example, one or more application servers, content servers, search servers, and the like. FIG. 1 also illustrates application hosting server 113.

Figure 2:
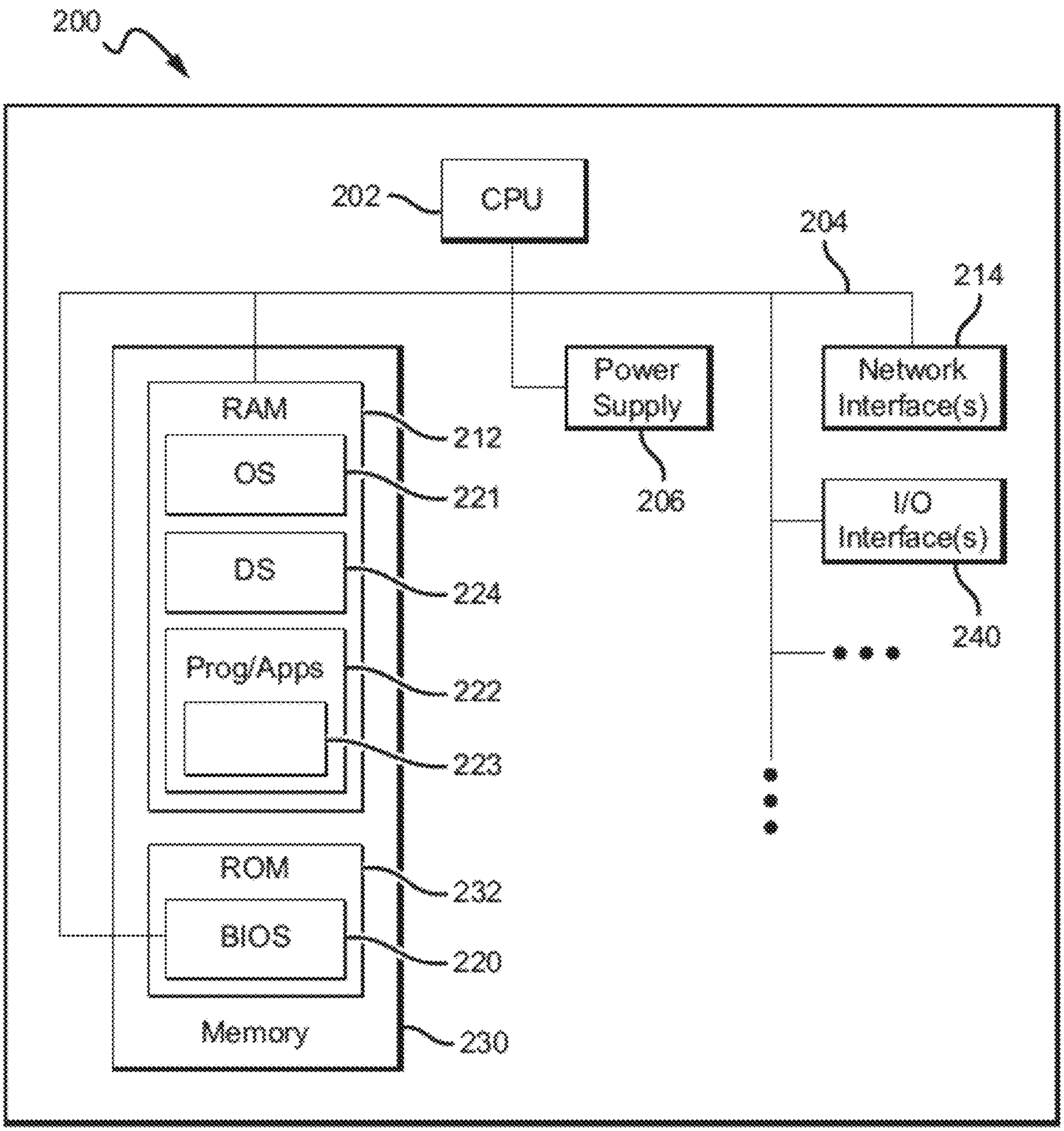
FIG. 2 illustrates an embodiment of a block diagram of an electronic device.

FIG. 2 illustrates a block diagram of an electronic device 200 that can implement one or more aspects of an apparatus, system, and/or method for layering security of cellular-enabled telemetered data (the "Engine") according to one embodiment of the present disclosure. Instances of the electronic device 200 may include servers, e.g., servers 107-109, and client devices, e.g., client devices 102-106. In general, the electronic device 200 can include a processor/CPU 202, memory 230, a power supply 206, and input/output (I/O) components/devices 240, e.g., microphones, speakers, displays, touchscreens, keyboards, mice, keypads, microscopes, GPS components, cameras, heart rate sensors, light sensors, accelerometers, targeted biometric sensors, etc., which may be operable, for example, to provide graphical user interfaces or text user interfaces.

A user may provide input via a touchscreen of an electronic device 200. A touchscreen may determine whether a user is providing input by, for example, determining whether the user is touching the touchscreen with a part of the user's body such as his or her fingers. The electronic device 200 can also include a communications bus 204 that connects the aforementioned elements of the electronic device 200. Network interfaces 214 can include a receiver and a transmitter (or transceiver), and one or more antennas for wireless communications.

The processor 202 can include one or more of any type of processing device, e.g., a Central Processing Unit (CPU), and a Graphics Processing Unit (GPU). Also, for example, the processor can be central processing logic, or other logic, may include hardware, firmware, software, or combinations thereof, to perform one or more functions or actions, or to cause one or more functions or actions from one or more other components. Also, based on a desired application or need, central processing logic, or other logic, may include, for example, a software-controlled microprocessor, discrete logic, e.g., an Application Specific Integrated Circuit (ASIC), a programmable/programmed logic device, memory device containing instructions, etc., or combinatorial logic embodied in hardware. Furthermore, logic may also be fully embodied as software.

The memory 230, which can include Random Access Memory (RAM) 212 and Read Only Memory (ROM) 232, can be enabled by one or more of any type of memory device, e.g., a primary (directly accessible by the CPU) or secondary (indirectly accessible by the CPU) storage device (e.g., flash memory, magnetic disk, optical disk, and the like). The RAM can include an operating system 221, data storage 224, which may include one or more databases, and programs and/or applications 222, which can include, for example, software aspects of the program 223. The ROM 232 can also include Basic Input/Output System (BIOS) 220 of the electronic device.

Software aspects of the program 223 are intended to broadly include or represent all programming, applications, algorithms, models, software, and other tools necessary to implement or facilitate methods and systems according to embodiments of the present disclosure. The elements may exist on a single computer or be distributed among multiple computers, servers, devices, or entities.

The power supply 206 contains one or more power components and facilitates supply and management of power to the electronic device 200.

The input/output components, including Input/Output (I/O) interfaces 240, can include, for example, any interfaces for facilitating communication between any components of the electronic device 200, components of external devices (e.g., components of other devices of the network or system 100), and end users. For example, such components can include a network card that may be an integration of a receiver, a transmitter, a transceiver, and one or more input/output interfaces. A network card, for example, can facilitate wired or wireless communication with other devices of a network. In cases of wireless communication, an antenna can facilitate such communication. Also, some of the input/output interfaces 240 and the bus 204 can facilitate communication between components of the electronic device 200, and in an example can ease processing performed by the processor 202.

Where the electronic device 200 is a server, it can include a computing device that can be capable of sending or receiving signals, e.g., via a wired or wireless network, or may be capable of processing or storing signals, e.g., in memory as physical memory states. The server may be an application server that includes a configuration to provide one or more applications, e.g., aspects of the Engine, via a network to another device. Also, an application server may, for example, host a web site that can provide a user interface for administration of example aspects of the Engine.

Any computing device capable of sending, receiving, and processing data over a wired and/or a wireless network may act as a server, such as in facilitating aspects of implementations of the Engine. Thus, devices acting as a server may include devices such as dedicated rack-mounted servers, desktop computers, laptop computers, set top boxes, integrated devices combining one or more of the preceding devices, and the like.

Servers may vary widely in configuration and capabilities, but they generally include one or more central processing units, memory, mass data storage, a power supply, wired or wireless network interfaces, input/output interfaces, and an operating system such as Windows Server, Mac OS X, Unix, Linux, FreeBSD, and the like.

A server may include, for example, a device that is configured, or includes a configuration, to provide data or content via one or more networks to another device, such as in facilitating aspects of an example apparatus, system, and method of the Engine. One or more servers may, for example, be used in hosting a Web site, such as the web site www.microsoft.com. One or more servers may host a variety of sites, such as, for example, business sites, informational sites, social networking sites, educational sites, wikis, financial sites, government sites, personal sites, and the like.

Servers may also, for example, provide a variety of services, such as Web services, third-party services, audio services, video services, email services, HTTP or HTTPS services, Instant Messaging (IM) services, Short Message Service (SMS) services, Multimedia Messaging Service (MMS) services, File Transfer Protocol (FTP) services, Voice Over IP (VOIP) services, calendaring services, phone services, and the like, all of which may work in conjunction with example aspects of an example systems and methods for the apparatus, system and method embodying the Engine. Content may include, for example, text, images, audio, video, and the like.

In example aspects of the apparatus, system and method embodying the Engine, client devices may include, for example, any computing device capable of sending and receiving data over a wired and/or a wireless network. Such client devices may include desktop computers as well as portable devices such as cellular telephones, smart phones, display pagers, Radio Frequency (RF) devices, Infrared (IR) devices, Personal Digital Assistants (PDAs), handheld computers, GPS-enabled devices tablet computers, sensor-equipped devices, laptop computers, set top boxes, wearable computers such as the Apple Watch and Fitbit, integrated devices combining one or more of the preceding devices, and the like.

Client devices such as client devices 102-106, as may be used in an example apparatus, system and method embodying the Engine, may range widely in terms of capabilities and features. For example, a cell phone, smart phone, or tablet may have a numeric keypad and a few lines of monochrome Liquid-Crystal Display (LCD) display on which only text may be displayed. In another example, a Web-enabled client device may have a physical or virtual keyboard, data storage (such as flash memory or SD cards), accelerometers, gyroscopes, respiration sensors, body movement sensors, proximity sensors, motion sensors, ambient light sensors, moisture sensors, temperature sensors, compass, barometer, fingerprint sensor, face identification sensor using the camera, pulse sensors, heart rate variability (HRV) sensors, beats per minute (BPM) heart rate sensors, microphones (sound sensors), speakers, GPS or other location-aware capability, and a 2D or 3D touch-sensitive color screen on which both text and graphics may be displayed. In some embodiments multiple client devices may be used to collect a combination of data. For example, a smart phone may be used to collect movement data via an accelerometer and/or gyroscope and a smart watch (such as the Apple Watch) may be used to collect heart rate data. The multiple client devices (such as a smart phone and a smart watch) may be communicatively coupled.

Client devices, such as client devices 102-106, for example, as may be used in an example apparatus, system and method implementing the Engine, may run a variety of operating systems, including personal computer operating systems such as Windows, iOS or Linux, and mobile operating systems such as iOS, Android, Windows Mobile, and the like. Client devices may be used to run one or more applications that are configured to send or receive data from another computing device. Client applications may provide and receive textual content, multimedia information, and the like. Client applications may perform actions such as browsing webpages, using a web search engine, interacting with various apps stored on a smart phone, sending, and receiving messages via email, SMS, or MMS, playing games (such as fantasy sports leagues), receiving advertising, watching locally stored or streamed video, or participating in social networks.

In example aspects of the apparatus, system and method implementing the Engine, one or more networks, such as networks 110 or 112, for example, may couple servers and client devices with other computing devices, including through wireless network to client devices. A network may be enabled to employ any form of computer readable media for communicating information from one electronic device to another. The computer readable media may be non-transitory. A network may include the Internet in addition to Local Area Networks (LANs), Wide Area Networks (WANs), direct connections, such as through a Universal Serial Bus (USB) port, other forms of computer-readable media (computer-readable memories), or any combination thereof. On an interconnected set of LANs, including those based on differing architectures and protocols, a router acts as a link between LANs, enabling data to be sent from one to another.

Communication links within LANs may include twisted wire pair or coaxial cable, while communication links between networks may utilize analog telephone lines, cable lines, optical lines, full or fractional dedicated digital lines including T1, T2, T3, and T4, Integrated Services Digital Networks (ISDNs), Digital Subscriber Lines (DSLs), wireless links including satellite links, optic fiber links, or other communications links known to those skilled in the art. Furthermore, remote computers and other related electronic devices could be remotely connected to either LANs or WANs via a modem and a telephone link.

A wireless network, such as wireless network 110, as in an example apparatus, system and method implementing the Engine, may couple devices with a network. A wireless network may employ stand-alone ad-hoc networks, mesh networks, Wireless LAN (WLAN) networks, cellular networks, and the like.

A wireless network may further include an autonomous system of terminals, gateways, routers, or the like connected by wireless radio links, or the like. These connectors may be configured to move freely and randomly and organize themselves arbitrarily, such that the topology of wireless network may change rapidly. A wireless network may further employ a plurality of access technologies including 2nd (2 G), 3rd (3 G), 4th (4 G) generation, Long Term Evolution (LTE) radio access for cellular systems, WLAN, Wireless Router (WR) mesh, and the like. Access technologies such as 2G, 2.5G, 3G, 4G, and future access networks may enable wide area coverage for client devices, such as client devices with various degrees of mobility. For example, a wireless network may enable a radio connection through a radio network access technology such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, and the like. A wireless network may include virtually any wireless communication mechanism by which information may travel between client devices and another computing device, network, and the like.

Internet Protocol (IP) may be used for transmitting data communication packets over a network of participating digital communication networks, and may include protocols such as TCP/IP, UDP, DECnet, NetBEUI, IPX, Appletalk, and the like. Versions of the Internet Protocol include IPv4 and IPv6. The Internet includes local area networks (LANs), Wide Area Networks (WANs), wireless networks, and long-haul public networks that may allow packets to be communicated between the local area networks. The packets may be transmitted between nodes in the network to sites each of which has a unique local network address. A data communication packet may be sent through the Internet from a user site via an access node connected to the Internet. The packet may be forwarded through the network nodes to any target site connected to the network provided that the site address of the target site is included in a header of the packet. Each packet communicated over the Internet may be routed via a path determined by gateways and servers that switch the packet according to the target address and the availability of a network path to connect to the target site.

The header of the packet may include, for example, the source port (16 bits), destination port (16 bits), sequence number (32 bits), acknowledgement number (32 bits), data offset (4 bits), reserved (6 bits), checksum (16 bits), urgent pointer (16 bits), options (variable number of bits in multiple of 8 bits in length), padding (may be composed of all zeros and includes a number of bits such that the header ends on a 32 bit boundary). The number of bits for each of the above may also be higher or lower.

A "content delivery network" or "content distribution network" (CDN), as may be used in an example apparatus, system and method implementing the Engine, generally refers to a distributed computer system that comprises a collection of autonomous computers linked by a network or networks, together with the software, systems, protocols and techniques designed to facilitate various services, such as the storage, caching, or transmission of content, streaming media and applications on behalf of content providers. Such services may make use of ancillary technologies including, but not limited to, "cloud computing," distributed storage, DNS request handling, provisioning, data monitoring and reporting, content targeting, personalization, and business intelligence. A CDN may also enable an entity to operate and/or manage a third party's web site infrastructure, in whole or in part, on the third party's behalf.

A Peer-to-Peer (or P2P) computer network relies primarily on the computing power and bandwidth of the participants in the network rather than concentrating it in a given set of dedicated servers. P2P networks are typically used for connecting nodes via largely ad hoc connections. A pure peer-to-peer network does not have a notion of clients or servers, but only equal peer nodes that simultaneously function as both "clients" and "servers" to the other nodes on the network.

Embodiments of the present disclosure include apparatuses, systems, and methods implementing the Engine. Embodiments of the present disclosure may be implemented on one or more of client devices 102-106, which are communicatively coupled to servers including servers 107-109. Moreover, client devices 102-106 may be communicatively (wirelessly or wired) coupled to one another. In particular, software aspects of the Engine may be implemented in the program 223. The program 223 may be implemented on one or more client devices 102-106, one or more servers 107-109, and 113, or a combination of one or more client devices 102-106, and one or more servers 107-109 and 113.

In an embodiment, the system may receive, process, generate and/or store time series data. The system may include an application programming interface (API). The API may include an API subsystem. The API subsystem may allow a data source to access data. The API subsystem may allow a third-party data source to send the data. In one example, the third-party data source may send JavaScript Object Notation ("JSON")-encoded object data. In an embodiment, the object data may be encoded as XML-encoded object data, query parameter encoded object data, or byte-encoded object data.

The present disclosure relates to systems and methods for layered security of cellular-enabled telemetered data. In an embodiment, the system may ensure secure transmission of patient medical information to one or more of said patient's client devices 102-106. Further, the system may enable direct transmission of patient medical information from a medical device 302 to said client devices 102-106. The direct transmission of medical information may reduce the frequency of transcription errors via manual input of medical information into a patient portal. Moreover, the layered security of protected health information may ensure said information is protected against cyberattacks.

Figure 3:
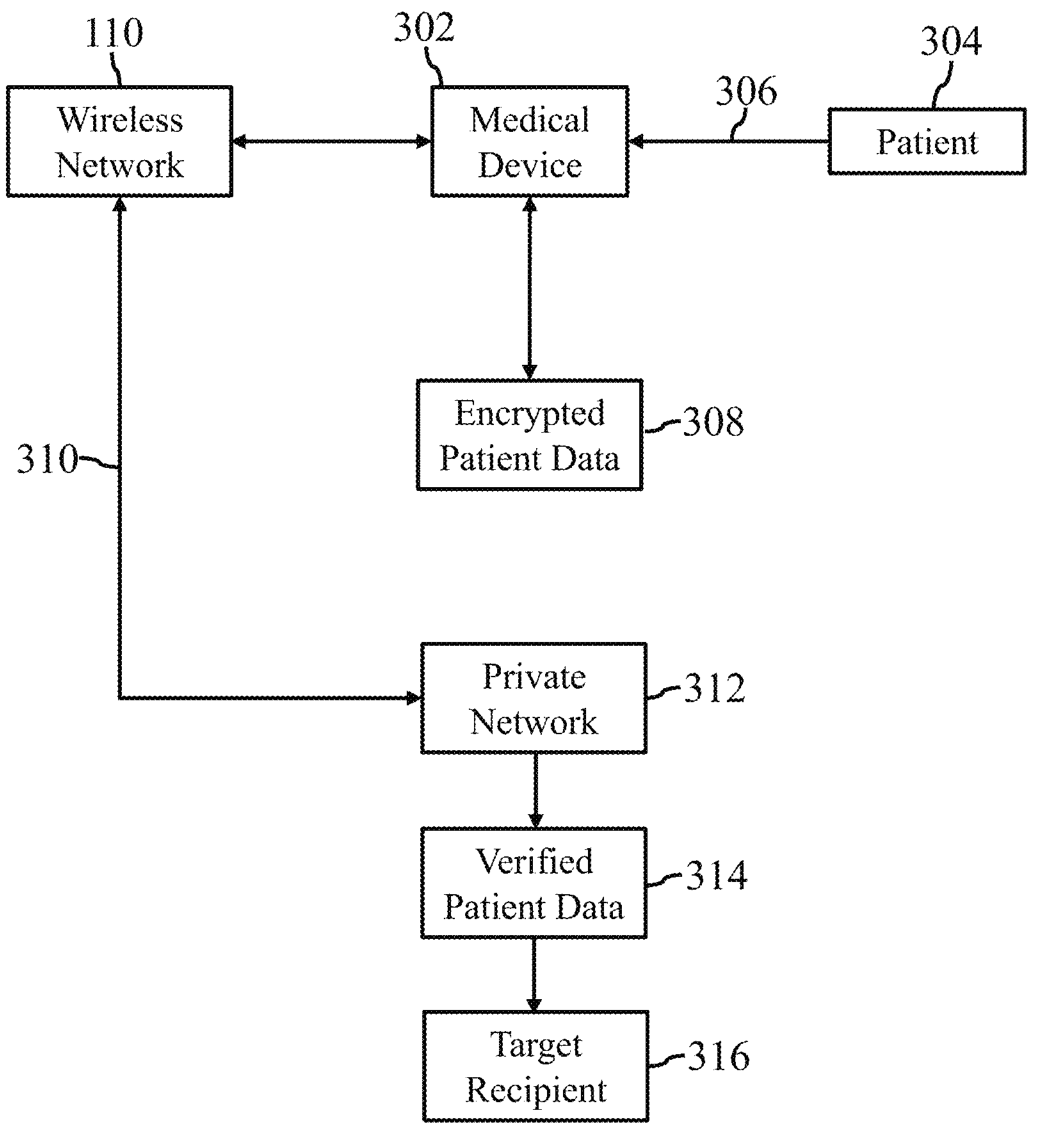
FIG. 3 illustrates an embodiment of a block diagram of a system for layered security of cellular-enabled telemetered data.

Referring to FIG. 3, the system for layered security of cellular-enabled telemetered data (the "system") 300 may include a medical device 302. The medical device 302 may include a scale configured to assess a patient's weight, a glucose monitor for determining a patient's blood glucose levels, and/or a blood pressure monitor for ascertaining a patient's blood pressure. However, any suitable medical device alternatives (e.g., pulse oximeters, electrocardiograms, hematology analyzers, microbial identification systems, etc.) may be encompassed by the medical device 302 of the present disclosure.

In an embodiment, the medical device 302 may collect raw patient data 306. In another embodiment, the raw patient data 306 may be comprised of both healthcare information and demographic information of a patient 304. Examples of healthcare information may include bodyweight, blood glucose levels, blood pressure, or other useful health-related metrics. Examples of demographic information may include age, gender, race and ethnicity, or other demographic information. As a non-limiting example, the demographic information may be associated with the patient 304, such that upon collection of the medical information, the demographic information and the medical information are grouped, thus forming the raw patient data 306.

In an embodiment, the system 300 is configured to receive the raw patient data 306 from the medical device 302. For example, in the context of pulse oximetry, the patient 304 may insert their finger into the medical device 302, wherein the medical device 302 may emit light through the patient's finger. In such an example, the medical device 302 is configured to analyze the light passing through said patient finger to determine the healthcare information (i.e., the blood oxygen saturation) of the patient 304. In another nonlimiting example, in the context of a scale, the patient 304 may step upon the medical device 302, wherein one or more transducer beams, located within the medical device 302, may bend causing a change in electrical resistance measured by a converter that is configured to ascertain the healthcare information (i.e., the bodyweight) of the patient 304.

Further, the medical device 302 may utilize various transmission protocol means, such as, but not limited to USSD message transmission technology, CMDA, SMS, GSM, and/or GPRS technology. Through said transmission protocols, at least one of messages and raw patient data 306 may be transmitted to a central database where said messages and data are stored.

Upon collection of the raw patient data 306, the medical device 302 may encrypt said data, thus transforming it into encrypted patient data 308. For example, the raw patient data 306 may be stored within a memory of the medical device 302, wherein the medical device 302 accesses said memory and applies an encryption algorithm to encrypt the raw the patient data 306. In an embodiment, the encryption algorithm may be comprised of a shared secret.

In one embodiment, the shared secret may consist of a specific piece of data, such as a Personal Identification Number (PIN) or password. The shared secret may enable two or more parties to securely exchange information. Specifically, after encrypted information is exchanged, the shared secret may enable the parties to decrypt the information, ensuring that only those with access to the shared secret can access the content.

In another embodiment, the shared secret may be shared prior to transmission of the encrypted patient data 308 or created at the start of transmission of the encrypted patient data 308. In a nonlimiting example, if the shared secret is shared prior to the transmission, the shared secret may be referred to as a pre-shared key. As a further nonlimiting example, the shared secret, may be created at the start of the transmission with a key-agreement protocol. In yet a further nonlimiting example, the shared secret may be at least one of an asymmetric-key algorithm and a symmetric-key algorithm.

In another embodiment, the symmetric-key algorithm may utilize a key to convert the raw patient data 306 into the encrypted patient data 308. In a nonlimiting example, the symmetric-key algorithm may be comprised of at least one of a key and a symmetric block cipher. In a further embodiment, the key may be at least one of a 128-bit key, a 256-bit key, a 576-bit key, and a 2040-bit key. However, any suitable size bit key alternative may comprise the key. In yet another embodiment, the symmetric block cipher may be comprised of at least one of an Advanced Encryption Standard (AES) block cipher, a Blowfish block cipher, a CAST-256 block cipher, a GOST block cipher, an International Data Encryption Algorithm (IDEA) block cipher, a Rivest Cipher 6 (RC-6) block cipher, a Serpent block cipher, and a Twofish block cipher. However, any suitable symmetric block cipher alternative may be utilized.

Additionally, upon creation of the encrypted patient data 308, the medical device 302 may sign said data, thus creating a data signature. For example, the encrypted patient data 308 may be cryptographically signed. The encrypted patient data 308 may be signed via a signing algorithm, which may include at least one of Rivest-Shamir-Adleman (RSA) algorithms, ElGamal signature scheme, Digital Signing Algorithm (DSA), and Elliptical Curve Digital Signature Algorithm (ECDSA). For example, the signing algorithm generates a first hash to accompany the encrypted patient data 308. In an embodiment, layering the encryption of the raw patient data 306 and generating the first hash, via the signing algorithm, to accompany the encrypted patient data 308, increases the security of the patient's protected healthcare information by providing multiple layers of protection a potential bad actor would need to decipher to access said protected healthcare information.

Further, the medical device 302 may connect to the wireless network 110. In an embodiment, such a connection to the wireless network 110 may be achieved via an Access Point Name (APN). As a nonlimiting example, the APN may be a private APN. In an additional embodiment, the APN may require the client devices 102-106 and/or the medical device 302 to be authorized prior to accessing the wireless network 110. The authorization may register the client devices 102-106 and/or the medical device 302 via a computing device identifier. The computing device identifier may be at least one of a Subscriber Identification Module (SIM), an International Mobile Equipment Identity (IMEI), and an Integrated Circuit Card Identification Number (IICID). For example, requiring at least one of the client devices 102-106 and the medical device 302 to be authorized ensures that the patient's protected healthcare information cannot be transmitted and/or received by unauthorized devices, thus providing an additional layer of security for said protected healthcare information.

After the medical device 302 connects to the wireless network 110, the encrypted patient data 308 may be transmitted. For example, the encrypted patient data 308 may be transmitted to a private network 312. In an embodiment, the encrypted patient data 308 may be transmitted within a tunnel 310. As a nonlimiting example, the tunnel 310 may be a persistent and fully redundant Internet Protocol Security (IPsec) Virtual Private Network (VPN) tunnel. In such an embodiment, the tunnel 310 may connect the wireless network 110 to the private network 312. Moreover, the tunnel 310 may leverage the symmetric-key algorithm to encrypt and protect the encrypted patient data 308 while traveling through the tunnel 310. In another embodiment, the tunnel 310 may also utilize Transport Layer Security (TLS) as another form of protection for transmitting the encrypted patient data 308 through the tunnel 310. As a nonlimiting example, the tunnel 310 is able to protect the encrypted patient data 308 travelling from the wireless network 110 to the private network 312. In such an example, the tunnel 310 acts as an additional layer of protection when a patient's protected healthcare information is being sent across the public internet. Presently, the current state of the art is not employing the aforementioned layers of security to protect a patient's healthcare information. However, the system 300, via the layering of at least the aforementioned security layers, creates a redundancy that is configured to better protect healthcare information that is being transmitted across the public internet.

Further, once the encrypted patient data 308 has travelled through the tunnel 310 it may be received by the private network 312. In an embodiment, the system 300 may generate an acknowledgment that is sent to the medical device 302 upon acceptance of the encrypted patient data 308 by the private network 312.

Upon receipt of the encrypted patient data 308, the private network 312 may verify the data signature of the encrypted patient data 308. For example, the private network 312 may compute a second hash at ingest of the encrypted patient data 308. Moreover, the second hash may be compared with the first hash. If said first and second hash are a match, then the private network 312 may accept the encrypted patient data 308, thus verifying the authenticity of said data 308. If the first and second hash are not a match the private network 312 may reject the encrypted patient data 308, thus ensuring the data 308 comes from a verified source.

Additionally, the private network 312 may decrypt the encrypted patient data 308, thus transforming said data 308 into verified patient data 314. The verified patient data 314 may then be quality controlled and/or stored. Further, the verified patient data 314 may be transmitted to a target recipient 316. In such an embodiment, the verified patient data 314 may be transmitted to one or more of the client devices 102-106 of the target recipient 316. In a further embodiment, the target recipient 316 may be the patient 304 whom the verified patient data 314 corresponds to. In another embodiment, the target recipient 316 may be a healthcare provider (e.g., a physician, a nurse, etc.) for the patient 304.

Figure 4:
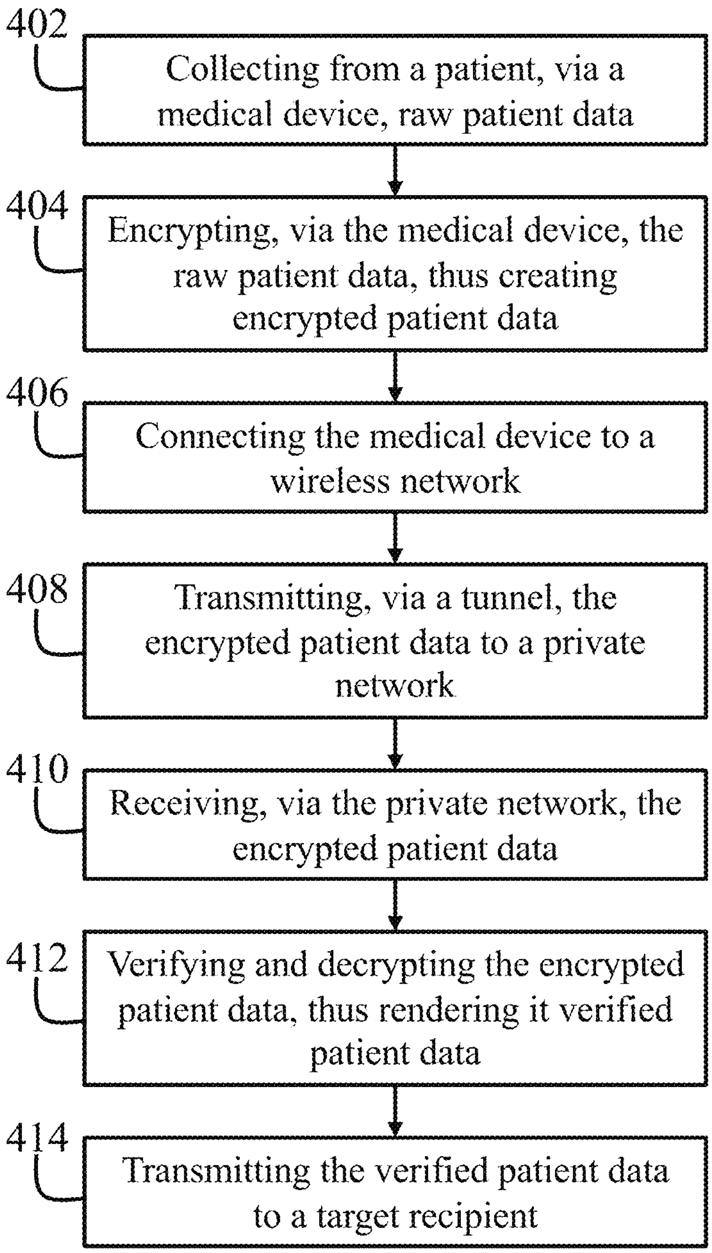
FIG. 4 illustrates an embodiment of a block diagram of a method for layered security of cellular-enabled telemetered data.

Turning to FIG. 4, a method for layered security of cellular-enabled telemetered data (the "method") 400 may be comprised of a first step 402.

In the first step 402, the medical device 302 may collect raw patient data 306 from the patient 304. In an embodiment, the medical device 302 may be comprised of at least one of a blood pressure monitor, a blood glucose monitor, a pulse oximeter, and a body weight scale. In such an embodiment, the raw patient data 306 may be the patient's: blood pressure, blood glucose levels, oxygen saturation, and/or body weight.

In a second step 404 of the method 400, after collecting the raw patient data 306 from the patient 304, the medical device 302 may encrypt, and sign said data 304, thus transforming it into encrypted patient data 308. In an embodiment, the medical device 302 may encrypt the raw patient data 306 with the shared secret, wherein the shared secret may be the symmetric-key algorithm. In another embodiment, the symmetric-key algorithm may be comprised of the key and the symmetric block cipher. For example, the symmetric block cipher may be AES-256. Moreover, the encrypted patient data 308 may be signed via the signing algorithm, wherein the first hash is created.

The method 400 may be further comprised of a third step 406, wherein the medical device 302 may connect to the wireless network 110. In an embodiment, the connection may be achieved via the APN.

Additionally, a fourth step 408 may be employed, wherein the encrypted patient data 308 is transmitted to the private network 312 from the medical device 302 via the tunnel 310. In an embodiment, the encrypted patient data 308 may first be transmitted from the medical device 302 to the wireless network 110, and then from the wireless network 110 to the private network 312 via the tunnel 310. In another embodiment, the tunnel 310 may be a persistent and fully redundant IPsec VPN tunnel. Furthermore, the tunnel 310 may also leverage TLS, as an additional form of protection for transmitting the encrypted patient data 308 through the tunnel 310.

A fifth step 410 of the method 400 may entail the private network 312 receiving the encrypted patient data 308. In an embodiment, upon receipt of the encrypted patient data 308, the private network 312 may transmit an acknowledgment to the medical device 302.

Furthermore, the method 400 may employ a sixth step 412, wherein the private network 312 may verify and decrypt the encrypted patient information 308. The verification and decryption of the encrypted patient data 308 may transform said data 308 into verified patient data 314. In such a step 412, the second hash may be generated upon receipt of the encrypted patient data 308, wherein said second hash is then compared to the first hash. Such a comparison may act as a verification of the source of encrypted patient data 308.

The method 400 may further include a seventh step 414, wherein the verified patient data 314 is quality controlled and/or relayed to the target recipient 316. In an embodiment, the target recipient 316 may be the patient 304 whom the verified patient data 314 corresponds to and/or a healthcare provider (e.g., a physician, a nurse, etc.) for the patient 304.

In an embodiment, at least one of the system 300 and the method 400 may aid in the prevention of a data breach via a cyberattack. For example, layering two or more of: (1) encrypting the raw patient data 306; (2) connecting the medical device 302 to the wireless network 110 via the APN; (3) transmitting the encrypted patient data 308 from the wireless network 110 to the private network 312 via the tunnel 310; (4) generating the acknowledgement and sending it to the medical device 302 upon the private network's 312 acceptance of the encrypted patient data 308; (5) verifying the data signature of the encrypted patient data 308 and decrypting said data 308; and (6) enabling the target recipient 316 to authenticate the sender of the verified patient data 314 may safeguard remote data transmissions of protected healthcare information from cellular-enabled devices.

As a nonlimiting example, layering 1, 2, and 3 above ensures that layer 2 reinforces layer 1 and that layer 3 reinforces layer 2. The redundancy in layering security measures creates a tamper proof system for transmitting protected healthcare information. Moreover, the industry at large utilizes the public Internet to transmit information without providing origin authentication. However, both the system 300 and method 400 are able to guarantee the origin and authenticity of protected healthcare information by sending encrypted healthcare information through the tunnel 310 from the wireless network 110 to the private network 312 and requiring a comparison and match of the first and second hashes. The aforementioned layering ensures protected healthcare information (i.e., the raw 306, encrypted 308, and verified patient data 314) reaches the target recipient 316, while simultaneously proscribing bad actors from accessing said protected information via cyberattack.

Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

Various elements, which are described herein in the context of one or more embodiments, may be provided separately or in any suitable subcombination. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

All references, patents and patent applications and publications that are cited or referred to in this application are incorporated in their entirety herein by reference. Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A system for improving security of cellular-enabled patient data transmission by layering security, the system comprising:

a medical device;

a wireless network connected to the medical device via an Access Point Name (APN), wherein the APN requires the medical device to be authorized prior to accessing the wireless network, the authorization registering the medical device via a computing device identifier, the computing device identifier comprising at least one of an International Mobile Equipment Identity (IMEI) and an Integrated Circuit Card Identification Number (ICCID);

a private network connected to the wireless network via a persistent and fully redundant Internet Protocol Security (IPsec) Virtual Private Network (VPN) tunnel;

one or more computer processors; and a memory having stored therein machine executable instructions, that when executed by the one or more processors, cause the system to:

receive, via the medical device, a patient interaction, the patient interaction including a medium from which raw patient data is collected;

encrypt, via the medical device, the raw patient data with a shared secret, wherein encrypting the raw patient data creates encrypted patient data;

generate, via the medical device, a first hash using a signing algorithm;

transmit, via the persistent and fully redundant IPsec VPN tunnel, the encrypted patient data from the medical device to the private network;

generate, via the private network, a second hash;

compare, via the one or more computer processors, the first hash to the second hash;

decrypt, via the one or more computer processors, the encrypted patient data upon a match of the first and second hash, wherein decrypting the encrypted patient data creates verified patient data; and transmit, via the one or more computer processors, the verified patient data to a target recipient.

2. The system of claim 1, wherein the shared secret is a symmetric-key algorithm comprising:

a key; and a symmetric block cipher.

3. The system of claim 2, wherein the key is comprised of at least one of a 128-bit key, a 256-bit key, a 576-bit key, and a 2040-bit key.

4. The system of claim 2, wherein the symmetric block cipher is comprised of at least one of an Advanced Encryption Standard (AES) block cipher, a Blowfish block cipher, a CAST-256 block cipher, a GOST block cipher, an International Data Encryption Algorithm (IDEA) block cipher, a Rivest Cipher 6 (RC-6) block cipher, a Serpent block cipher, and a Twofish block cipher.

5. The system of claim 2, wherein the persistent and fully redundant IPsec VPN tunnel leverages the symmetric-key algorithm to encrypt the encrypted patient data while said encrypted patient data is travelling through the persistent and fully redundant IPsec VPN tunnel.

6. The system of claim 1, wherein the persistent and fully redundant IPsec VPN tunnel is further comprised of Transport Layer Security (TLS).

7. The system of claim 1, wherein the verified patient data is transmitted to one or more client devices of the target recipient.

8. The system of claim 1, wherein the signing algorithm is comprised of at least one of Rivest-Shamir-Adleman (RSA) algorithms, EIGamal signature scheme, Digital Signing Algorithm (DSA), and Elliptical Curve Digital Signature Algorithm (ECDSA).

9. The system of claim 1, wherein the private network generates an acknowledgment that is sent to the medical device upon acceptance of the encrypted patient data by the private network.

10. The system of claim 1, wherein, upon a mismatch of the first hash and the second hash, the private network rejects the encrypted patient data.

11. The system of claim 1, wherein the Access Point Name (APN) is a private APN, and the computing device identifier further comprises a Subscriber Identification Module (SIM).

12. The system of claim 1, wherein the raw patient data comprises healthcare information and demographic information of a patient.

13. A method for improving security of cellular-enabled patient data transmission by layering security, the method comprising:

collecting, via patient interaction with a medical device, raw patient data from the patient;

encrypting, via an encryption algorithm generated by the medical device, the raw patient data, creating encrypted patient data;

signing, via a signing algorithm, the encrypted patient data creating a first hash;

connecting, via an Access Point Name (APN), the medical device to a wireless network, wherein the APN requires the medical device to be authorized prior to accessing the wireless network, the authorizing comprising registering the medical device via a computing device identifier, the computing device identifier comprising at least one of an International Mobile Equipment Identity (IMEI) and an Integrated Circuit Card Identification Number (ICCID);

connecting, via a persistent and fully redundant Internet Protocol Security (IPsec) Virtual Private Network (VPN) tunnel, the wireless network to a private network;

transmitting, the encrypted patient data from the medical device to the private network, wherein, upon receipt of the encrypted patient data, the private network generates a second hash;

verifying, via a comparison of the first hash and second hash, the encrypted patient data, wherein upon a match of the first hash and the second hash, the private network decrypts the encrypted patient data, creating verified patient data; and transmitting the verified patient data to a target recipient.

14. The method of claim 13, wherein the encryption algorithm comprises a shared secret.

15. The method of claim 14, wherein the shared secret is a symmetric-key algorithm comprising:

a key; and a symmetric block cipher.

16. The method of claim 15, wherein the key is comprised of at least one of a 128-bit key, a 256-bit key, a 576-bit key, and a 2040-bit key.

17. The method of claim 15, wherein the symmetric block cipher is comprised of at least one of an Advanced Encryption Standard (AES) block cipher, a Blowfish block cipher, a CAST-256 block cipher, a GOST block cipher, an International Data Encryption Algorithm (IDEA) block cipher, a Rivest Cipher 6 (RC-6) block cipher, a Serpent block cipher, and a Twofish block cipher.

18. The method of claim 15, wherein the persistent and fully redundant IPsec VPN tunnel leverages the symmetric-key algorithm to encrypt the encrypted patient data while travelling through the persistent and fully redundant IPsec VPN tunnel.

19. The method of claim 13, wherein the persistent and fully redundant IPsec VPN tunnel is further comprised of Transport Layer Security (TLS).

20. The method of claim 13, wherein the signing algorithm is comprised of at least one of Rivest-Shamir-Adleman (RSA) algorithms, ElGamal signature scheme, Digital Signing Algorithm (DSA), and Elliptical Curve Digital Signature Algorithm (ECDSA).

* * * * *